(12) United States Patent
Rajgopal et al.

(10) Patent No.: US 9,338,522 B2
(45) Date of Patent: May 10, 2016

(54) INTEGRATION OF UNTRUSTED FRAMEWORK COMPONENTS WITH A SECURE OPERATING SYSTEM ENVIRONMENT

(71) Applicant: Broadcom Corporation, Irvine, CA (US)

(72) Inventors: Narayan Rajgopal, San Jose, CA (US); Marcus C. Kellerman, San Diego, CA (US); David Erickson, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/715,395

(22) Filed: Dec. 14, 2012

(65) Prior Publication Data

US 2014/0115623 A1 Apr. 24, 2014

Related U.S. Application Data

(60) Provisional application No. 61/715,785, filed on Oct. 18, 2012, provisional application No. 61/725,790, filed on Nov. 13, 2012, provisional application No. 61/725,964, filed on Nov. 13, 2012.

(51) Int. Cl.
| | | |
|---|---|---|
| *H04N 7/16* | (2011.01) | |
| *H04N 21/835* | (2011.01) | |
| *H04N 21/443* | (2011.01) | |

(52) U.S. Cl.
CPC ........... *H04N 21/835* (2013.01); *H04N 21/443* (2013.01); *H04N 21/4437* (2013.01)

(58) Field of Classification Search
CPC   H04N 7/163; H04N 21/4532; H04N 21/4542
USPC ........................... 725/28, 131–134, 139–142; 709/217–232
See application file for complete search history.

(56) References Cited

U.S. PATENT DOCUMENTS 4,926,476 A * 5/1990 Covey ................. G06F 21/6218
                                          711/163
5,202,997 A * 4/1993 Arato ...................... G06F 21/82
                                          726/34

(Continued)

FOREIGN PATENT DOCUMENTS

| EP | 1522923 A2 | 4/2005 |
| WO | 2006011888 A1 | 2/2006 |

(Continued)

OTHER PUBLICATIONS

European Patent Office; European Search Report; EP Application No. 13004995.0; Jan. 8, 2014; 3 pgs.

(Continued)

*Primary Examiner* — Annan Shang
(74) *Attorney, Agent, or Firm* — Garlick & Markison; Bruce E. Garlick

(57) ABSTRACT

A set top box or like device incorporating an untrusted software framework as a client of a secure operating system kernel. The software framework may comprise, for example, an Android framework supported by an underlying Linux operating system environment having a secure kernel. The software framework can be executed using a variety of process isolation techniques depending on performance and isolation requirements. A secure access client/server interface may also be provided to support interactions between the untrusted software framework (and applications utilizing the untrusted software framework) and secure or trusted portions of the device. The secure access interface can be configured to perform operations such as handle validation, heap pointer validation, non-pointer parameter validation, heap isolation, and resource release relating to terminated processes. In further embodiments, a software framework aggregator is used to support a plurality of additional software frameworks for use in the set top box.

20 Claims, 10 Drawing Sheets

(56) References Cited

U.S. PATENT DOCUMENTS

| | | | | |
|---|---|---|---|---|
| 5,305,456 | A * | 4/1994 | Boitana | G06F 21/62 |
| | | | | 726/20 |
| 6,487,723 | B1 * | 11/2002 | MacInnis | A63F 13/12 |
| | | | | 348/E5.006 |
| 6,578,078 | B1 * | 6/2003 | Smith | G06F 17/3089 |
| | | | | 707/999.01 |
| 7,401,354 | B2 * | 7/2008 | Boden | H04L 29/12481 |
| | | | | 380/277 |
| 7,467,408 | B1 * | 12/2008 | O'Toole, Jr. | H04L 63/145 |
| | | | | 726/13 |
| 7,814,554 | B1 * | 10/2010 | Ragner | G06F 21/52 |
| | | | | 713/165 |
| 8,689,282 | B1 * | 4/2014 | Oprea | H04L 63/20 |
| | | | | 726/1 |
| 2002/0041665 | A1 * | 4/2002 | Meyer | H04M 1/18 |
| | | | | 379/145 |
| 2004/0025016 | A1 | 2/2004 | Focke et al. | |
| 2008/0005171 | A1 | 1/2008 | Cameron | |
| 2008/0104695 | A1 * | 5/2008 | Fassino | G06F 21/6218 |
| | | | | 726/17 |
| 2008/0127355 | A1 | 5/2008 | Lorch et al. | |
| 2009/0013393 | A1 * | 1/2009 | Xi | 726/7 |
| 2009/0106480 | A1 * | 4/2009 | Chung | G06F 12/0866 |
| | | | | 711/100 |
| 2009/0170472 | A1 * | 7/2009 | Chapin et al. | 455/410 |
| 2013/0074069 | A1 * | 3/2013 | Li | G06F 9/45533 |
| | | | | 718/1 |

FOREIGN PATENT DOCUMENTS

| | | |
|---|---|---|
| WO | 2006122024 A2 | 11/2006 |
| WO | 2012102568 A2 | 8/2012 |

OTHER PUBLICATIONS

European Patent Office; European Search Report; EP Application No. 13004977.8; Jan. 28, 2014; 3 pgs.

European Patent Office; European Search Report; EP Application No. 13004978.6; Jan. 7, 2014; 4 pgs.

Aciicmez, et al.; A Secure DVB Set-Top Box via Trusting Computing Technologies; 6th IEEE Consumer Communications and Networking Conference; Jan. 10-13, 2009; pp. 1-8.

Kuzmanovic, et al.; Google's android as an application environment for DTV decoder system; 2010 IEEE 14th International Symposium on Consumer Electronics; Jun. 7-10, 2010; pp. 1-5.

Winter, et al.; A Flexible Software Development and Emulation Framework for ARM TrustZone; Proceedings of the Third International Conference; INTRUST 2011; In Lecture Notes in Computer Science; Nov. 27, 2011; pp. 1-15; vol. 7222.

* cited by examiner

INTEGRATION OF UNTRUSTED FRAMEWORK COMPONENTS WITH A SECURE OPERATING SYSTEM ENVIRONMENT

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/715,785, entitled "INTEGRATION OF UNTRUSTED FRAMEWORK COMPONENTS WITH A SECURE OPERATING SYSTEM ENVIRONMENT", filed Oct. 18, 2012, pending.

2. U.S. Provisional Patent Application Ser. No. 61/725,964, entitled "INTEGRATION OF UNTRUSTED APPLICATIONS AND FRAMEWORKS WITH A SECURE OPERATING SYSTEM ENVIRONMENT", filed Nov. 13, 2012, pending.

3. U.S. Provisional Patent Application Ser. No. 61/725,790, entitled "SET TOP BOX APPLICATION IN A CONCURRENT DUAL ENVIRONMENT", filed Nov. 13, 2012, pending.

BACKGROUND OF THE INVENTION

1. Technical Field of the Invention

The present invention relates generally to processing systems and, more particularly, to secure integration of an untrusted framework or pathway and a secure operating system environment in devices such as a set top box.

2. Description of Related Art

Attempts to accommodate relatively untrusted software applications or frameworks in certain types of devices may complicate applicable certification processes that are performed in accordance with one or more industry defined certification standards or testing procedures. For example, vendor certification of many set top boxes used by cable operators is conducted via rigid certification processes that test interoperability and security compliance for devices that implement specifications such as DOCSIS®, PacketCable™, CableHome™, and OpenCable™. Successful certification of such devices typically requires full end-to-end security. Likewise, digital rights management (DRM) and other technologies implemented in a particular device or component (such as a system-on-a-chip) may require distinct certification processes which do not allow certain interactions with an unsecured operating system (OS) environment or software framework.

In general, any unsecured portions of a media pathway in a set top box or like device, if not isolated, will cause the certification of such pathway to fail. Most conventional set top boxes are designed to provide a single secure and certified pathway through the various elements of the device. In some recent multi-processor set top boxes, a conventional certified pathway is separated from untrusted components by creating a hardware boundary between the two. In particular, a first processing module is utilized to provide secure functionality (e.g., decoding operations), while a separate processing module with a lower security level is used to support an untrusted framework.

As is known, a software framework may provide application programming interface functionality and services that are not offered by an underlying operating system, and may thereby offer a level of platform independence in certain implementations. Frameworks are often designed to be a reusable and adaptable software system or subsystem. For example, Android™ has become one of the fastest-growing operating systems/frameworks for mobile devices. Android, which builds on contributions from the open-source Linux community, provides development tools and reusable components for building applications that can be deployed across many different types of devices, such as a smartphone or tablet device.

A typical Android framework is a "multi-user" Linux-based system in which each Android application is a different "user" having code that runs in general isolation from other applications. Such process isolation (or application "sandbox") provides a certain level of security. However, various components, processes, threads, etc. used by an application may not entail sufficient protection when integrated in a set top box-type device, resulting in Android being considered an "untrusted" framework when used in such devices. For example, an application that visits an arbitrary web page or receives code from an unverified third party may result in untrusted JavaScript code being executed on a set top box, possibly with elevated privileges. Such code might exploit weakness in other code (e.g., browser code) and receive unauthorized access to file systems, etc., thereby compromising the security of a device, exposing protected data or introducing system instability.

As indicated above, the processing unit of some devices may have multiple processors or processing cores in order to provide higher performance and/or multi-tasking capabilities. In some of these multi-processor systems, when multiple applications or programs are running, access control is typically needed to separate the functionality of the applications running on multiple processors. Separation or segregation of different applications and/or tasks running on different processors helps to ensure that one application does not interfere with the execution of another. Likewise data assigned to one processor should not be accessed by another processor, unless that data is shared between the two processors. Such separation is typically handled through use of virtual memory, with each process having a unique view of memory that is not accessible from outside processes. Hardware access can be handled through a kernel or device driver interface, which provides some level of security. Even in a multi-processor system in which one processor environment provides trusted or secure operations while another operates in an unsecure or restricted environment, however, there can be a substantial possibility of an incursion from the unsecure zone into the secure zone when the operating system is managing the separation.

For example, in a set top box that allows a user to receive television signals and also allows the user to access the Internet, the secure environment may run applications (including a secure set top box application) pertaining to the reception, decryption and display of certain channels or content provided by a cable or satellite provider or other service operator. The unsecure environment in the set top box may execute applications, such as Android-based applications, that allow a user to access the Internet for web browsing, gaming, etc. In this example, the content provider would generally not want the user or anyone else to access the applications pertaining to broadcast or premium channels. However, if there is commonality in software that controls the accesses to both environments, such as running the same operating system to manage accesses in both environments, then there may be a heightened risk of access violations. Such violations, whether intentional or non-intentional, could result in an unsecure breach into the secure applications of the set top box, such as a web-originated intrusion into protected television channels.

Accordingly, there is a need to obtain an efficient way to integrate untrusted frameworks, framework components and applications with a secure operating system environment such as that of a set top box device.

DETAILED DESCRIPTION OF THE INVENTION

While certain embodiments are described in conjunction with an Android framework and/or Linux operating system, other embodiments of the present invention may be practiced with a variety of current or future operating systems/kernels and frameworks, and employ a variety of computing circuits, devices, servers and/or systems that might utilize multiple processors, processing cores and/or processing circuits. Further, certain of the illustrations herein describe a processing module, a processor or a CPU (e.g. CPU1, CPU2) for a device that provides a processing function in the described embodiments. However, it is appreciated that a variety of other devices and/or nomenclature may be used in other embodiments to provide for the processing function in practicing the invention. The invention may be readily adapted to other usages where multiple processing environments (zones, domains, etc.) exist, in which separation and/or segregation between two or more zones is desired Likewise, while certain embodiments are described as implemented by a set top box (STB) or like media processing device performing trusted media processing operations, the novel architectures and methodologies are applicable in whole or in part to other devices, including media consumption devices such as PVR's, DVD players, access points, televisions, computing devices, smartphones, etc.

Figure 1:
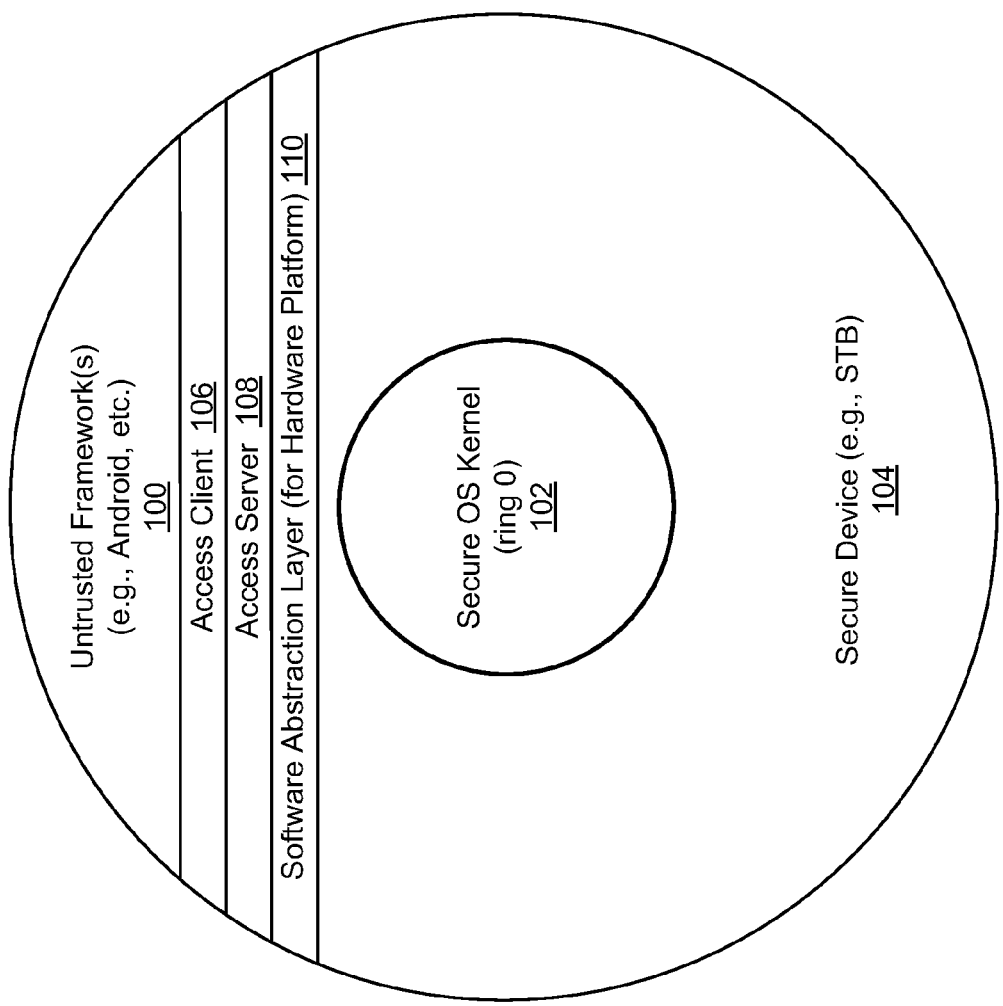
FIG. 1 illustrates integration of an untrusted framework and secure operating system kernel in accordance with an embodiment of the present disclosure.

FIG. 1 illustrates integration of an untrusted framework 100 (such as an Android framework) and secure operating system (OS) kernel 102 within a secure device (such as a certified set top box device) 104 in accordance with an embodiment of the present disclosure. In general, the OS kernel 102 may be viewed as the heart (or ring 0) of the operating system, providing an interface between system hardware and the rest of the operating system and installed applications.

As described more fully below, a secure software abstraction layer 110 is provided to isolate access to underlying software, hardware and secure components of the device. Communications and data exchanges between the untrusted framework 100 and secure OS kernel 102 may occur via a secure access layer or interface comprised of a secure access client 106 and secure access server 108 that support an application programming interface (API) and secure inter-process communication (IPC) calls or kernel drivers. In certain embodiments, the secure access client 106 may be part of or accessible by the framework 100, while the secure access server 108 is incorporated in a secure operating system environment or executed as a secure kernel module. In one embodiment, the secure access interface may help prevent system breaches or destabilization resulting from bad data or parameters by performing, without limitation, parameter validation/checking and peripheral range checking through hardware (when applicable), handle validation, direct/indirect heap pointer validation, heap isolation, and release of hardware resources following termination of a restricted process. In operation, the secure access server 108 may limit access to server side libraries and return errors in response to invalid or illegal parameters passed by clients. The secure access interface may further perform watchdog functions to free resources reserved by runaway or unstable clients.

As noted, Android provides a component-based framework for developing mobile applications. Each application may be comprised of differing numbers and types of components. By way of example, such components can include "Activity" components that form the basis of a user interface, where each screen presented to the user is a different Activity. Background processing is performed by "Service" components, which also define arbitrary interfaces for communicating with other applications. "Content Provider" components function to share information in a relational database form, while "Broadcast Receiver" components operate as an asynchronous mailbox for messages from the system and/or other components.

An Android framework according to the disclosed embodiment may support varying degrees of collaboration and dependencies between applications. However, the interfaces used by applications to provide services and communicate with other applications or an underlying operating system must be secured to defend against breaches and general malfeasance. By default, applications in a typical Android framework, do not have permission to perform operations that might negatively impact other system components (such as reading or writing private data or another application's files, performing network access, etc.). Because Android essentially "sandboxes" applications from each other, applications must explicitly share resources and data by declaring permissions needed for additional capabilities that are outside of the basic sandbox. For example, an application may statically declare the permissions it requires, and at the time of installation the Android framework may prompt a user for appropriate consents. As noted above in the Description of the Related Art, and without rigid hardware isolation and separate execution environments, the potential for execution of unauthorized code from an untrusted framework may compromise overall system security and negatively impact certification procedures for certain devices absent methodologies and architectures (e.g., a secure access server) such as those described herein.

Figure 2:
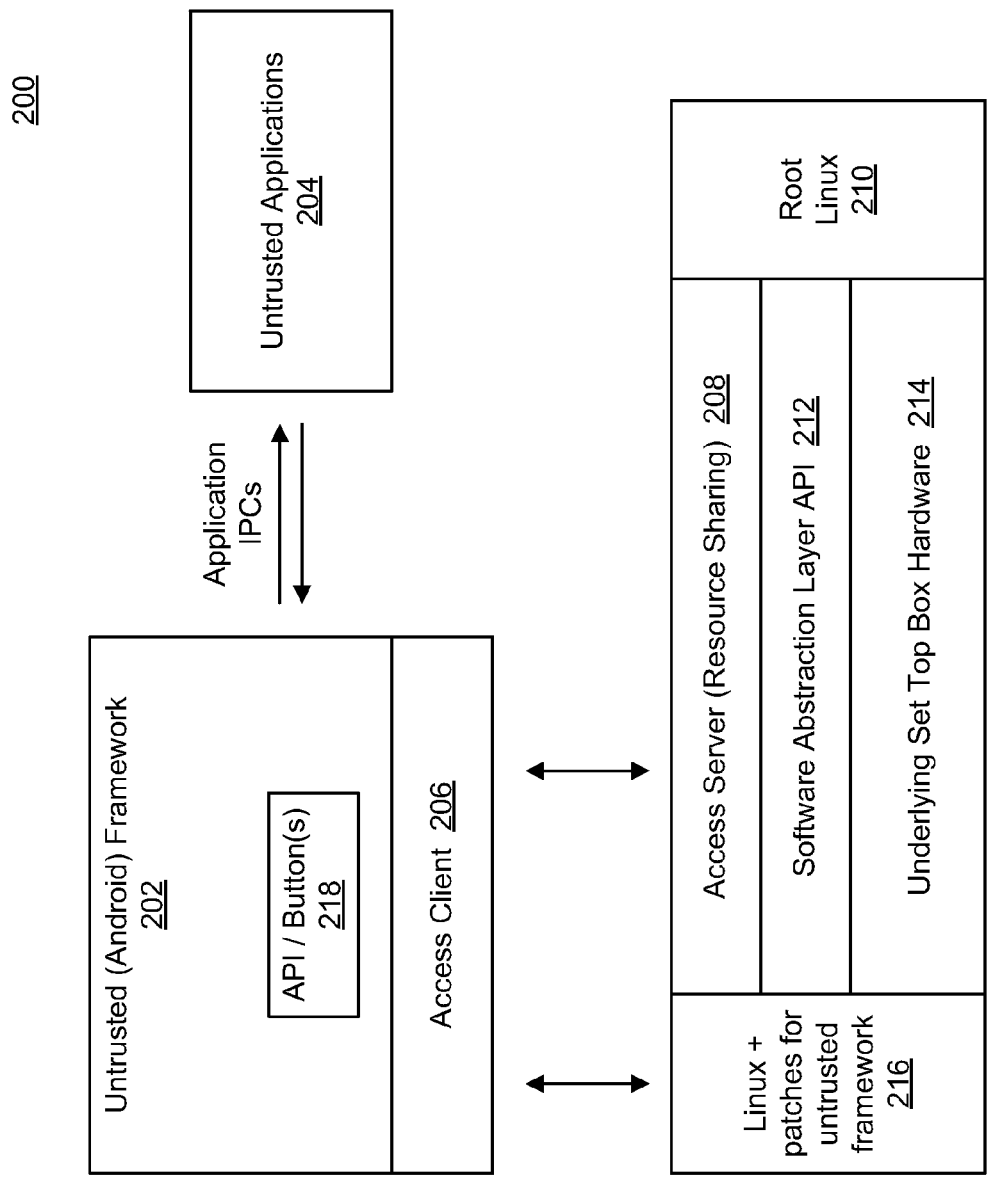
FIG. 2 illustrates integration of an untrusted framework as a client of a secure operating system environment in accordance with an embodiment of the present disclosure.

Referring now to FIG. 2, integration of an untrusted framework 202 as a client of a secure operating system environment in accordance with an embodiment of the present disclosure is shown. The secure operating system environment can be incorporated in a secure device such as a set top box or other media processing/consumption device 200. In this embodiment, execution of the untrusted framework 202 (including components thereof, as well as untrusted applications 204) is performed by the secure operating system environment using process isolation techniques. Such process isolation techniques may entail, for example, utilizing virtual address space where the address space for a first process is different than that of a second process. Inter-process memory access may be prohibited, or tightly controlled in certain implementations (e.g., where system policies permit processes to collaborate over IPC channels such as shared memory or local sockets).

Access to a secure or trusted root operating system, such as Linux-based operating system 210, and/or underlying hardware, such as secure set top box hardware 214, is provided via an access server 208 operating in concert with an access client 206 and a software abstraction layer API 212. In the illustrated embodiment, a complete or partial Linux operating system instance 216, including any necessary software patches, is provided to support execution of the untrusted framework 202. The access client 206 may further function to govern communications between the untrusted framework 202 and the complete or partial Linux operating system instance 216. In addition, the framework 202 may include an API or one or more buttons 218 that enable, for example, a visual display of available applications 204 (which may be executed on the untrusted framework 202 using, for example, application IPC calls).

Figure 3:
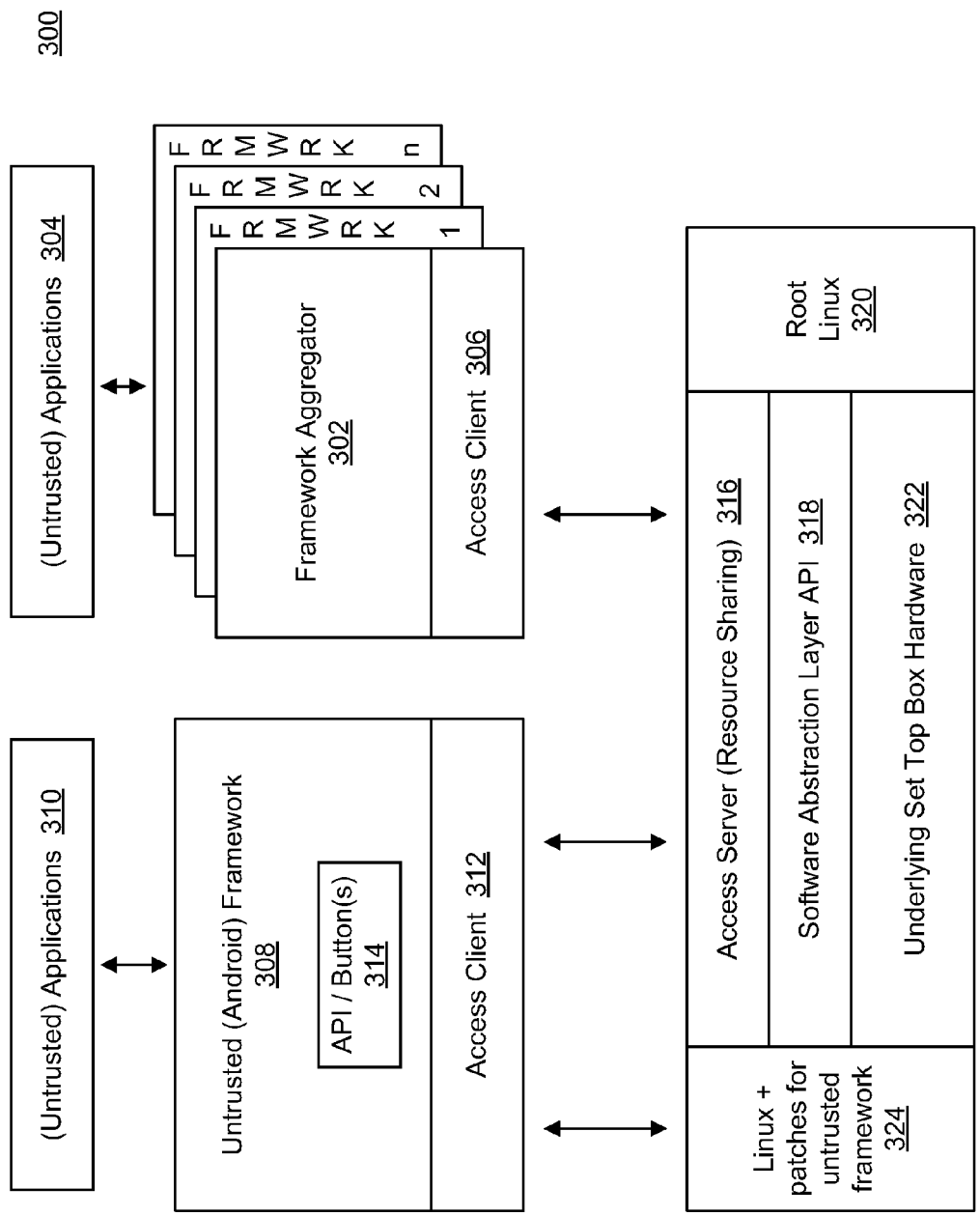
FIG. 3 illustrates an untrusted framework and a framework aggregator as clients of a secure operating system environment in accordance with various embodiments of the present disclosure.

FIG. 3 illustrates an untrusted framework 308 and a framework aggregator 302 as clients of a secure operating system environment in accordance with various embodiments of the present disclosure. In the illustrated embodiment, the framework "aggregator" 302 may be employed to embrace and extend operation with a wide variety of frameworks 1-n in order to support a wide variety of (untrusted) applications 304. In this manner, for example, a service provider can provide secure access to system resources to third party frameworks and other "middleware" offerings. Such offerings may include, by way of example and without limitation, Adobe Air®, Adobe Flash®, Apple iOS®, Microsoft Silverlight®, Java™ and like side-by-side technologies. The framework aggregator 302 may include a set of tailored operating system libraries and HTML capabilities to support such technologies, as well as user interface web engine access, etc.

In certain embodiments, user interfaces supported by the framework aggregator 302 may enable a user to launch applications supported by the untrusted framework 308. For example, an Android framework 308 and/or framework aggregator 302 may offer a series of APIs or buttons 314, including an Android button that provides a visual display of available Android applications. Further, the Android framework 308 and framework aggregator 302 may share a graphics screen. In this manner, it may not be necessary to port functionality into the Android framework 308 that might otherwise be necessary. It is noted that in a given device, an Android framework 308 may be built using a different tool chain than that utilized by other frameworks supported by the framework aggregator 302, and support execution of a different set of applications 310.

As described more fully in conjunction with FIG. 2, the untrusted framework 308 and the framework aggregator 302 are supported in the illustrated set top box 300 by an access server 316, software abstraction layer API 318, root Linux operating system 320, underlying set top box hardware 322, and a complete or partial Linux operating system instance 324 (including any necessary software patches). In the illustrated embodiment, an access client 312 enables secure communications between the untrusted framework and access server 316, while the framework aggregator 302 is similarly supported by an access client 306.

Figure 4:
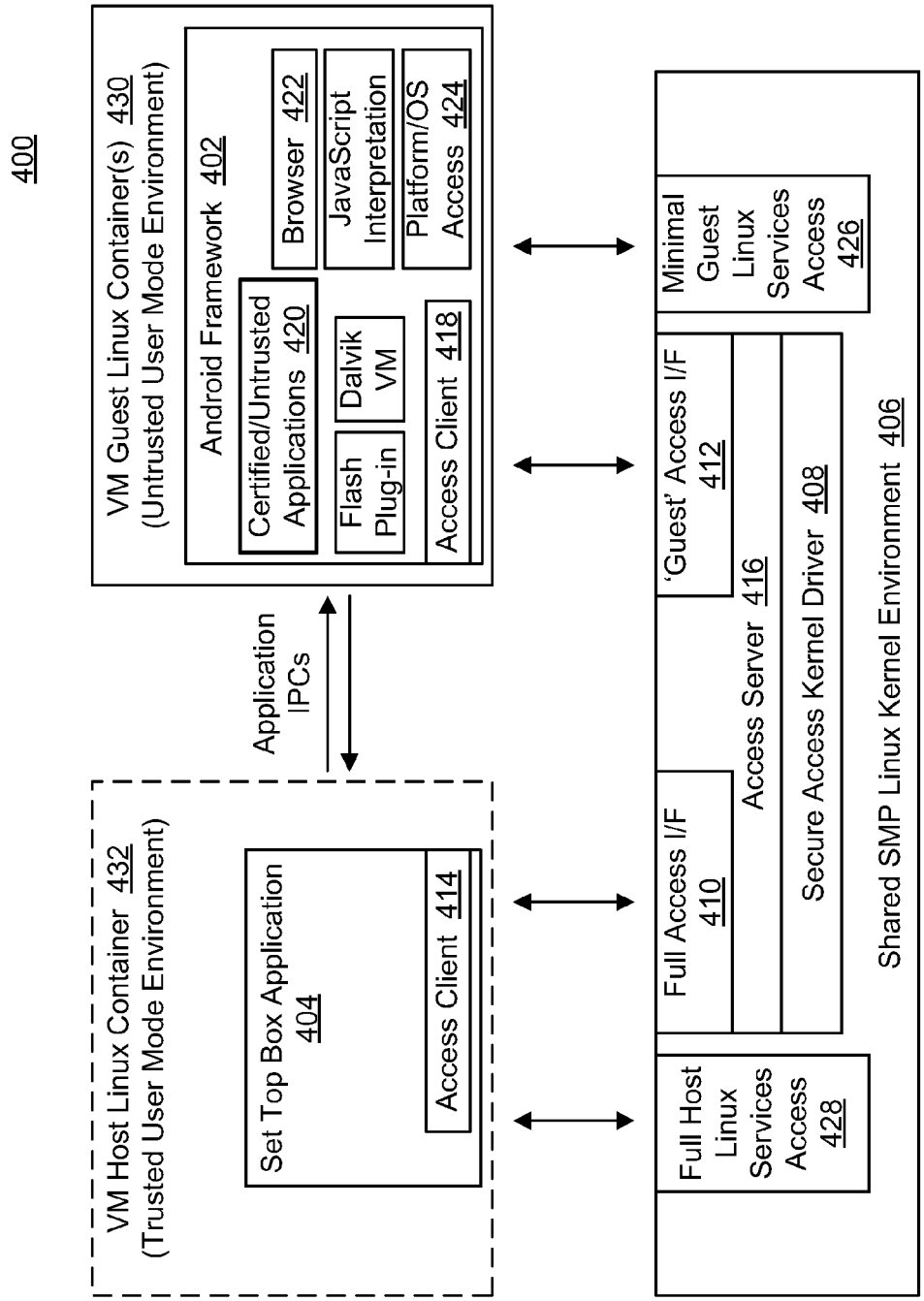
FIG. 4 illustrates an untrusted framework as a client of a set top box application in a virtualized environment in accordance with various embodiments of the present disclosure.

FIG. 4 illustrates an untrusted framework 402 as a client of a set top box application ("STB application") 404 in a virtualized environment in accordance with various embodiments of the present disclosure. As shown, a STB application 404 is provided to perform basic operations of a set top box 400, and interfaces with an untrusted "client" framework such as an Android framework 402. In this embodiment, the STB application 404 is executed in a secure or privileged Linux operating system kernel environment, such as a Symmetric Multiprocessing (SMP) Linux kernel environment 406, that includes a secure access kernel driver 408 and an access server 416 that includes a full access interface 410 for use by the STB application 404, and a more limited guest access interface 412 for use by the Android framework 402 via an access client 418. The STB application 404 includes access client 414 functionality that supports communications with the full access interface 410 and enables the Android framework 402 to run as an untrusted client of the secure Linux kernel environment 406 using, for example, container-based virtualization. As may be appreciated, the client/server architecture allows untrusted processes to crash or terminate without compromising underlying hardware and causing system instability.

In addition to an access client 418, the Android framework 402 of the illustrated embodiment may include trusted/certified and/or untrusted applications and application support 420, JavaScript interpretation, browser functions 422, plug-ins (e.g., an Adobe Flash plug-in), and a Dalvik virtual machine. In some embodiments, certified applications 420 may be downloaded from or supplied by a service operator, content provider, cloud-based source or the like. The Android framework 402 further includes platform or operating system access functionality 424 that enables limited access to necessary components of the secure Linux kernel environment 406 through a minimal guest Linux services access interface 426.

A variety of virtualization techniques may be employed in various embodiments according to the present disclosure, including implementations utilizing virtual systems running on either a shared operating system kernel or separate operating system kernels. Selection of a particular approach may depend on the required level of isolation, as well as availability of processing and memory resources. In the illustrated embodiment, the untrusted Android framework 402 is executed in a first virtual machine (VM) guest Linux container(s) 430 (such as an "LXC" or Linux resource container) to provide further isolation from secure processes and resources. In this embodiment, the STB application may similarly operate in a second VM host Linux container 432 having full host Linux services access 428. Briefly, and in general, container-based virtualization (or operating system-level virtualization) allows a kernel to run with a plurality of isolated virtual machines or virtual environments installed on top of it. Each virtual environment may be dedicated to run a particular application, and is typically not a complete operating system instance, but rather a partial instance of the operating system that works with a virtualization layer (or hardware resource abstraction layer) in the host operating system kernel.

Figure 7:
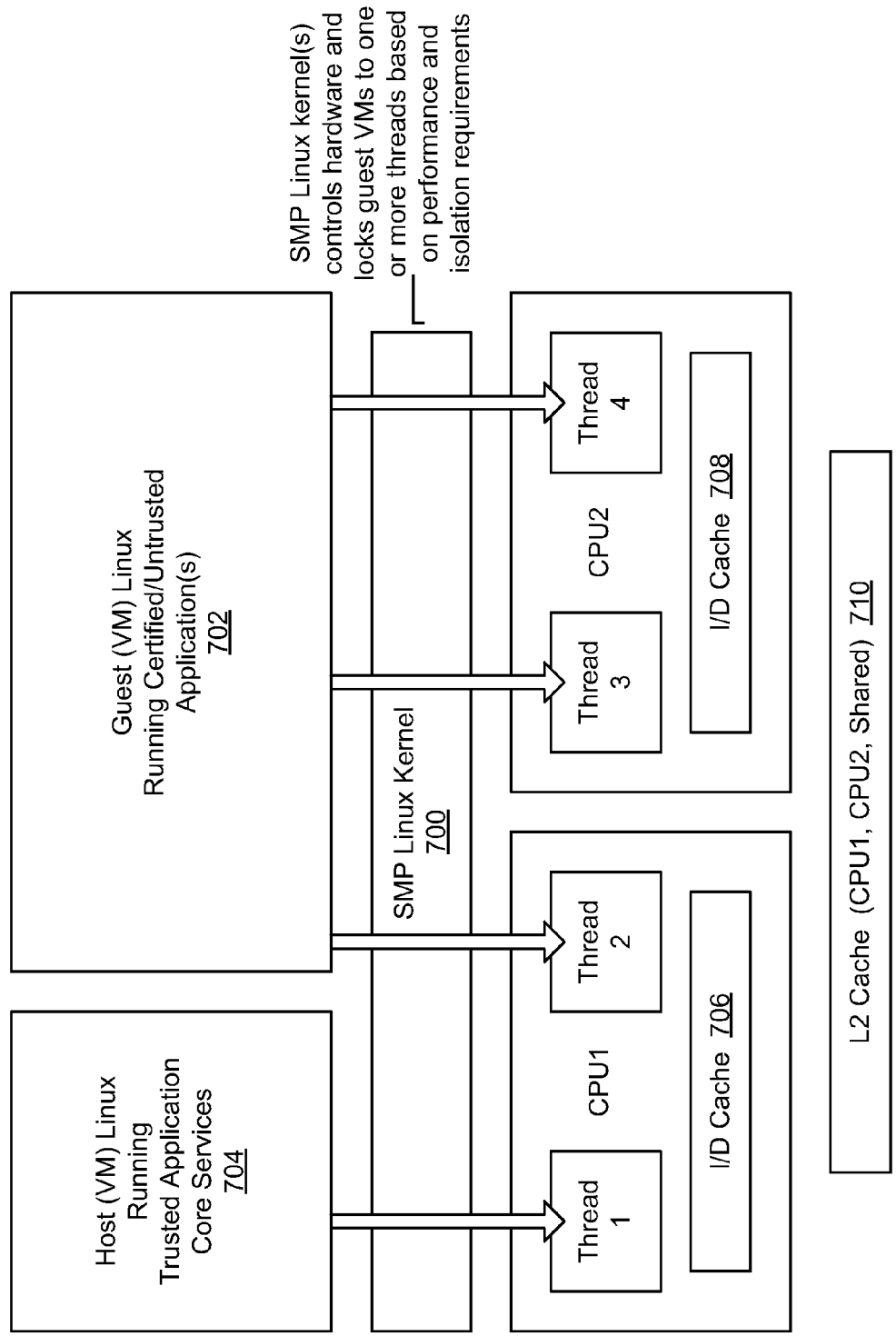
FIG. 7 illustrates integration of trusted and untrusted software in a multi-processor environment in accordance with an embodiment of the present disclosure.

Although virtualization may mitigate the need for hardware separation of untrusted components, in certain embodiments multiple processors having different levels of security may benefit from virtual container constructs which operate wholly via one of such processors, while other containers may span multiple processors (see, for example, the embodiment illustrated in FIG. 7). In one such embodiment, a first processor(s) may be dedicated to execution of non-secure functionality, while a second, secure processor(s) may be dedicated to conventional STB functionality. In various alternate embodiments, an untrusted framework may be hardware sandboxed via, for example, non-processor hardware/peripherals, memory isolation from processors and/or peripherals, etc. Various other divisions between secure and untrusted software and hardware are contemplated (e.g., dividing an untrusted framework or applications themselves into a "trusted" portion and an "untrusted" portion), examples of which are described below. Further, by utilizing hardware and operating system virtualization features, multiple operating systems may run simultaneously on the same hardware.

Figure 5:
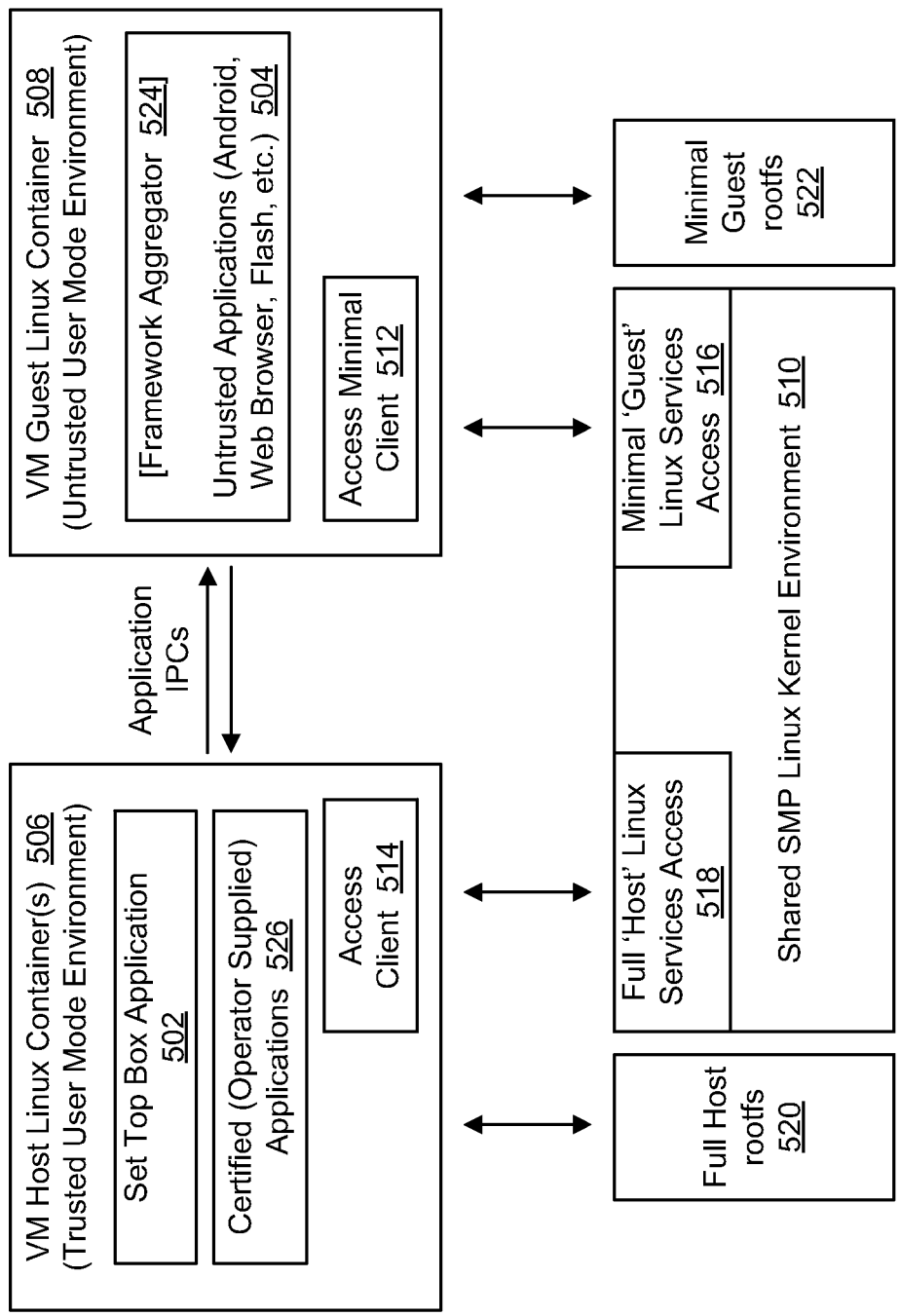
FIG. 5 illustrates concurrent operation of set top box application and an untrusted framework utilizing virtual containers in accordance with various embodiments of the present disclosure.

FIG. 5 illustrates concurrent operation of set top box application 502 and untrusted client applications/frameworks 504 utilizing virtual containers 506 and 508, respectively, in accordance with various embodiments of the present disclosure. In the illustrated embodiment, untrusted client applications and frameworks interact with secure portions of an underlying set top box platform—including the set top box application 502, certified (operator supplied) applications 526 and secure Linux kernel environment 510—through application IPC calls and an access minimal client 512 that accesses minimal "guest" Linux services access 516. Likewise, applications in a trusted user mode (or "privileged") operating system environment receive full access to "host" Linux services access 518 via an access client 514. The trusted user mode environment can be supported by a full host root filesystem 520, while a minimal guest root filesystem 522 on a separate partition or disk can support the untrusted user mode (or "restricted") operating system environment.

In some embodiments, certain resources of a set top box platform, such as media processing and hardware acceleration resources (for audio/video encoding and decoding, rendering of 2D and 3D graphics using a standardized API (such as Open Graphics Library or "OpenGL"), DRM, encryption/decryption, etc.) and networking interfaces, may be accessed by untrusted client applications/frameworks 504 through IPC calls communicated through network sockets Likewise, events such as IR control signals may be communicated from a set top box platform to untrusted client applications/frameworks 504 through IPC calls (such as a call into an Android API or button). In the illustrated embodiment, a framework aggregator 524 such as that described above may be employed to embrace and extend operation with a wide variety of frameworks.

In alternate embodiments, a trusted portion(s) of a (Android) framework, web browser, etc., and a corresponding untrusted portion(s) are executed in one or more separate virtual machine containers. The trusted portion may include a secure platform and operating system access interface. Using an example involving a web browser, the portion of the browser that executes potentially unsafe Flash or JavaScript code (such as a rendering engine) can be executed in the "untrusted" virtual machine container with limited file system and peripheral access, while the portion of the browser that has access to underlying platform hardware and sensitive operating system resources can be executed in one or more "trusted" virtual machine containers. In further embodiments, the trusted portion may comprise a secure clone of a framework, or modified version of a framework that supports secure applications and/or secure portions of applications. In such embodiments, unsecure applications or portions thereof may be executed by portions of a framework residing in an untrusted or restricted user domain or container. Various approaches to process isolation and hardware sandboxing may be employed to further isolate untrusted portions of a framework and to support restricted operating system environments.

In further embodiments according to the disclosure, a set top box or other secure architecture can utilize certified applications that are executable in a manner consistent with an industry standard certification process(es). The certified applications may be preinstalled or downloaded, for example, from a catalog of certified applications provided by a service operator or cloud-based source. Such applications might include, by way of example, media streaming applications (e.g., Netflix), gaming applications, web browsing applications, iOS-based applications, Android applications, etc. In some embodiments, it may be necessary to incorporate or download additional operating systems to support corresponding classes of certified applications. Alternatively, different certified versions of a given application may be made available to support a variety of installed operating systems and/or frameworks. Certified applications may be executed in one or more virtual machine containers.

In another exemplary embodiment, a primary set top box application is constructed as an Android application executed in one or more virtual machine containers. As with frameworks, the set top box application may be partitioned into a trusted portion(s) and an untrusted portion(s). Depending on the capabilities of the underlying Android framework, non-standard API's or libraries may be required to support certain set top box functionality, such as PVR, picture-in-picture, transcoding, and channel tuning operations. Further, this approach may require special interfacing (e.g., passing a string to an interface to create an encode path as part of a hardware call) or provision of non-standard functions (or even applications) to address services and functions that may be lacking in a relevant framework or required for certification. For example, an Android framework might be extended to include non-standard functionality—without negatively impacting compatibility—by providing services that are "hidden" under the Android porting layers and receive and interpret uniform resource identifiers ("URIs") passed through such layers.

In other embodiments, instead of an end-to-end security definition being managed by the source or being defined by the content itself (or associated metadata), each application that is downloaded (or preinstalled) includes a full security definition. For example, each application may have its own downloadable conditional access security (dCAS) or downloadable DRM element/definition. A corresponding certification process might entail, for example, certifying a part of an overall secure pathway, with one or more applications providing the final portion of the certification. Alternatively, a predefined plurality of conditional access mechanisms may be provided, with a (downloaded) application defining which mechanism is to be used. It may then be possible to certify a secure "boundary" without regard to the conditional access requirements of a particular company or media.

In various embodiments, a set top box or like device may exchange capabilities with other devices in a media consumption network (e.g., PVR's, DVD players, access points, televisions, computing devices, smartphones, etc.) to compare against the requirements of an application. Once this is done, the application may select which one or more modes of operation, if any, that it will permit. If the set top box cannot support such modes (due to resource competition or otherwise), such modes become unavailable. If available a set of modes of operation can be selected and dynamically switched to other of such modes on the fly during a media stream delivery, which may require coordination with the application or the source to support the transition (possibly requiring quality changes in the media stream).

Figure 6:
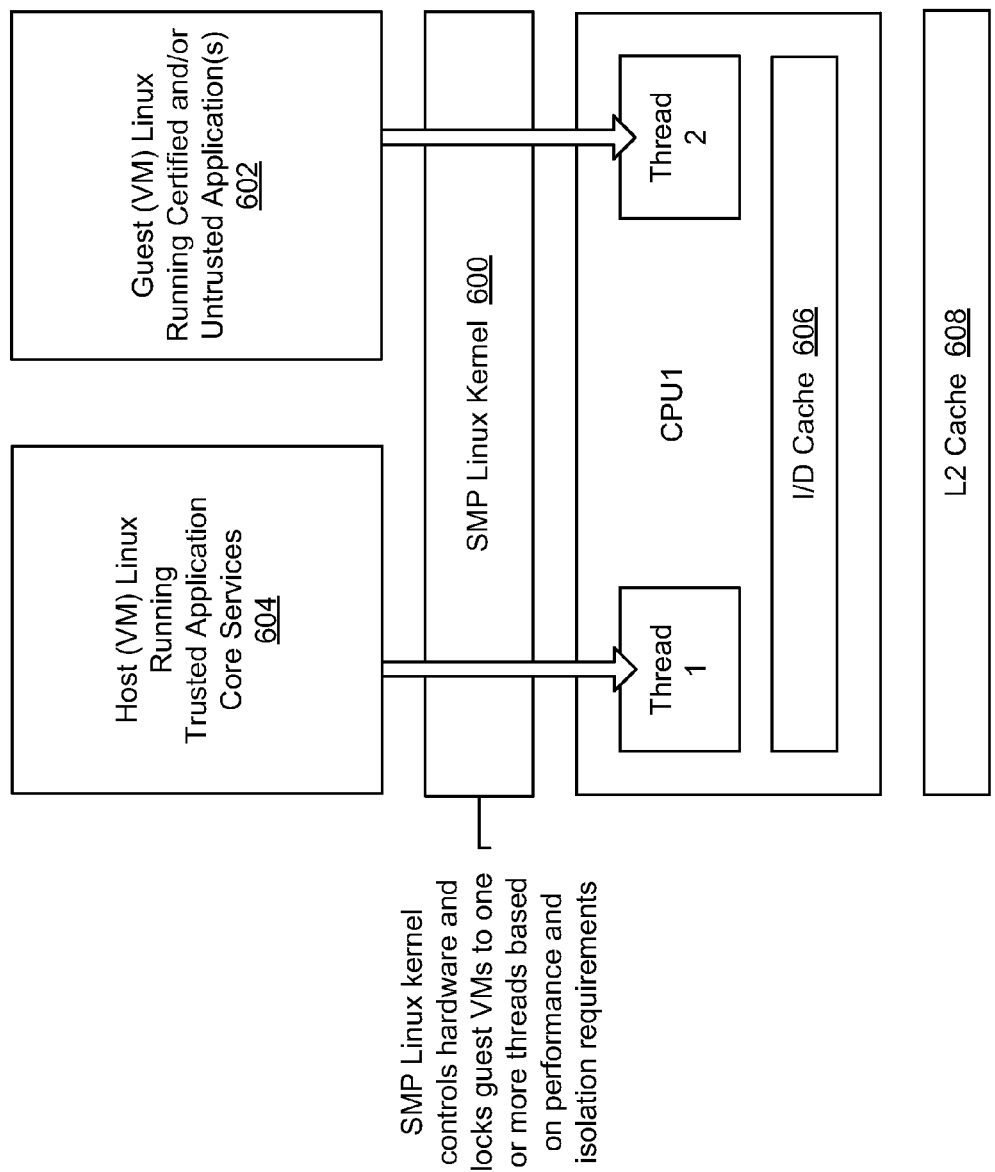
FIG. 6 illustrates integration of trusted and untrusted software in a single processor environment in accordance with an embodiment of the present disclosure.

FIG. 6 illustrates integration of trusted and untrusted software in a single processor (CPU1) environment in accordance with an embodiment of the present disclosure. In this embodiment, an SMP Linux kernel 600 functions to control hardware and lock guest virtual machines 602 (supporting a "guest" instance of Linux and running certified and/or untrusted applications) and host virtual machines 604 (running trusted application core services) to one or more separate CPU threads based on performance and/or security isolation requirements.

In Linux, a "process" generally refers to a task that is tracked by a kernel 600 for execution. Processes in an operating system such as Linux may be isolated from other processes, as well as the kernel 600. For example, a process typically cannot access kernel memory. As is known, Linux processes may also utilize multiple execution threads, with each thread sharing the resources of the initiating process but having a separate instruction pointer.

In one embodiment, the SMP Linux kernel 600 can perform load balancing for processes in both virtual machines across multiple CPU threads or cores when maximum performance is desired. Further, a host virtual machine 604 with control of a guest virtual machine 602 can terminate and restart a process in the guest virtual machine 602 (or the entire container) if it misbehaves or is compromised. Hard limits can be placed on CPU utilization by a guest virtual machine in order to prevent disruption of core underlying device functionality and to facilitate termination of runaway processes. In operation, separate threads may have segregated and/or restricted access to an I/D cache 606 and L2 cache 608.

FIG. 7 illustrates integration of trusted and untrusted software in a multi-processor system in accordance with an embodiment of the present disclosure. The illustrated system may be implemented in a device, module, board, etc. One or more components of the system may also be implemented on an integrated circuit chip or on multiple integrated circuit chips. The particular embodiment of FIG. 7 shows two processing modules identified as CPU1 and CPU2, respectively. Although two processing modules are shown, other embodiments may have more than two processing modules or processors, and it is noted that CPU1 and CPU2 may be comprised of various processing devices, circuitry, etc. In one embodiment, CPU1 and CPU2 may be comprised of different processing cores of a single CPU, or some other processing circuitry.

Referring more particularly to the figure, the SMP Linux kernel 700 functions to control hardware and lock a guest virtual machine(s) 702 instance of Linux (running certified and/or untrusted applications) and a host virtual machine(s) 704 (running trusted application core services) to one or more separate threads 1-4 based on performance and/or security isolation requirements. For example, an untrusted application might be executed in a virtual machine container that spans both CPU1 and CPU2. As described more fully below, various portions of I/D caches 706 and 708 and L2 cache 710 may be restricted to a particular thread or CPU, or shared with appropriate safeguards.

Figure 8:
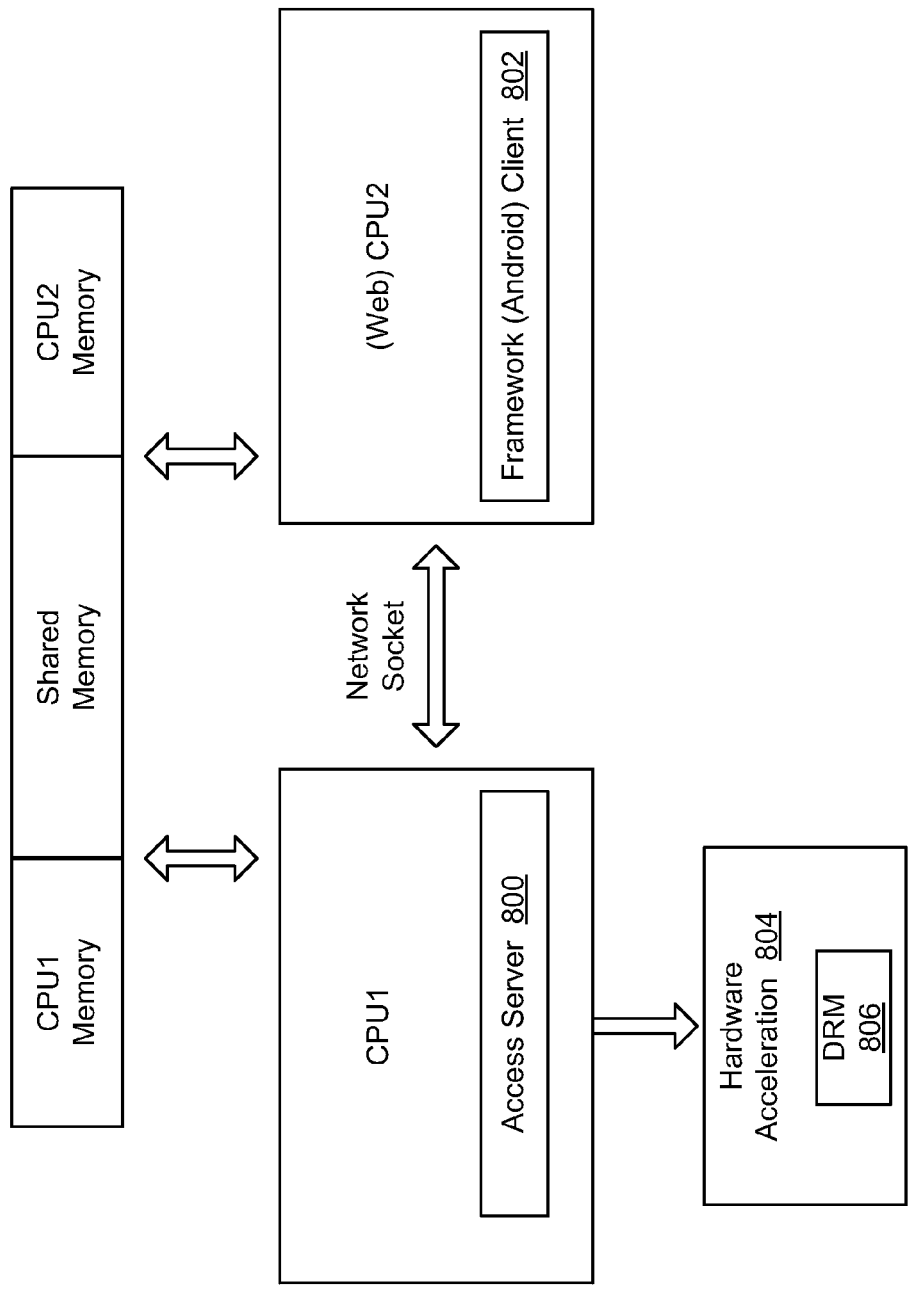
FIG. 8 is a block diagram of a multi-processor system supporting hardware segregation of operating system environments in accordance with various embodiments of the present disclosure.

FIG. 8 is a block diagram of another multi-processor system supporting hardware segregation of operating system environments in accordance with various embodiments of the present disclosure. For example, a first processor(s) CPU1 may be dedicated to conventional STB functionality and support a secure access server 800, while a second processor(s) (web) CPU2 may be dedicated to execution of non-secure functionality and untrusted applications (e.g., an Android framework client 802 or web browser). A trusted execution environment supported by CPU1 can limit access to certain core STB functionality, including hardware acceleration blocks 804, DRM capabilities 806, and the like.

In one embodiment, CPU1 and CPU2 are both segregated into separate and distinct zones when in a "sandboxing" mode. In another embodiment, the trusted CPU1 is set up having its own segregated regions of memory and also given access rights over some or all address ranges of memory mapped portions of CPU2. Generally, when operating in separate or segregated zones, environments or domains, the two CPUs operate on different applications, so that CPU1 executes one set of instructions, while CPU2 executes a different set of instructions. Segregation or separation of this nature is typically referred to as sandboxing or sandbox mode. The purpose of most sandboxing is to prevent one zone from accessing functionality in the other zone or to have controlled access of one zone into another. In some instances, both zones may be limited from having access to the other zone or only have controlled access between zones. In some applications, one zone may be regarded as a secure, privileged or trusted zone and the other as a restricted, non-secure or non-trusted zone, in which access by the applications operating on the non-secure zone are prevented or controlled from accessing certain applications running in the secure zone.

As noted above, a number of devices utilize multiple processors or processing cores to run separate programs, applications, etc. In a situation where one zone is not to have access to a second zone, one way to ensure this separation is by checking the accesses to the system memory. That is, by ensuring accesses that are allocated to CPU1 are not accessed by CPU2, unless the location of the access is a shared location, applications running on CPU2 may be prevented from breaching the functional separation. One way to achieve this protection is to provide an access check and access control to ensure that the correct processing module is accessing a permitted location for that processing module. In the illustrated embodiment, CPU1 and CPU2 may communicate directly through a network socket, IPC calls, etc.

Figure 9:
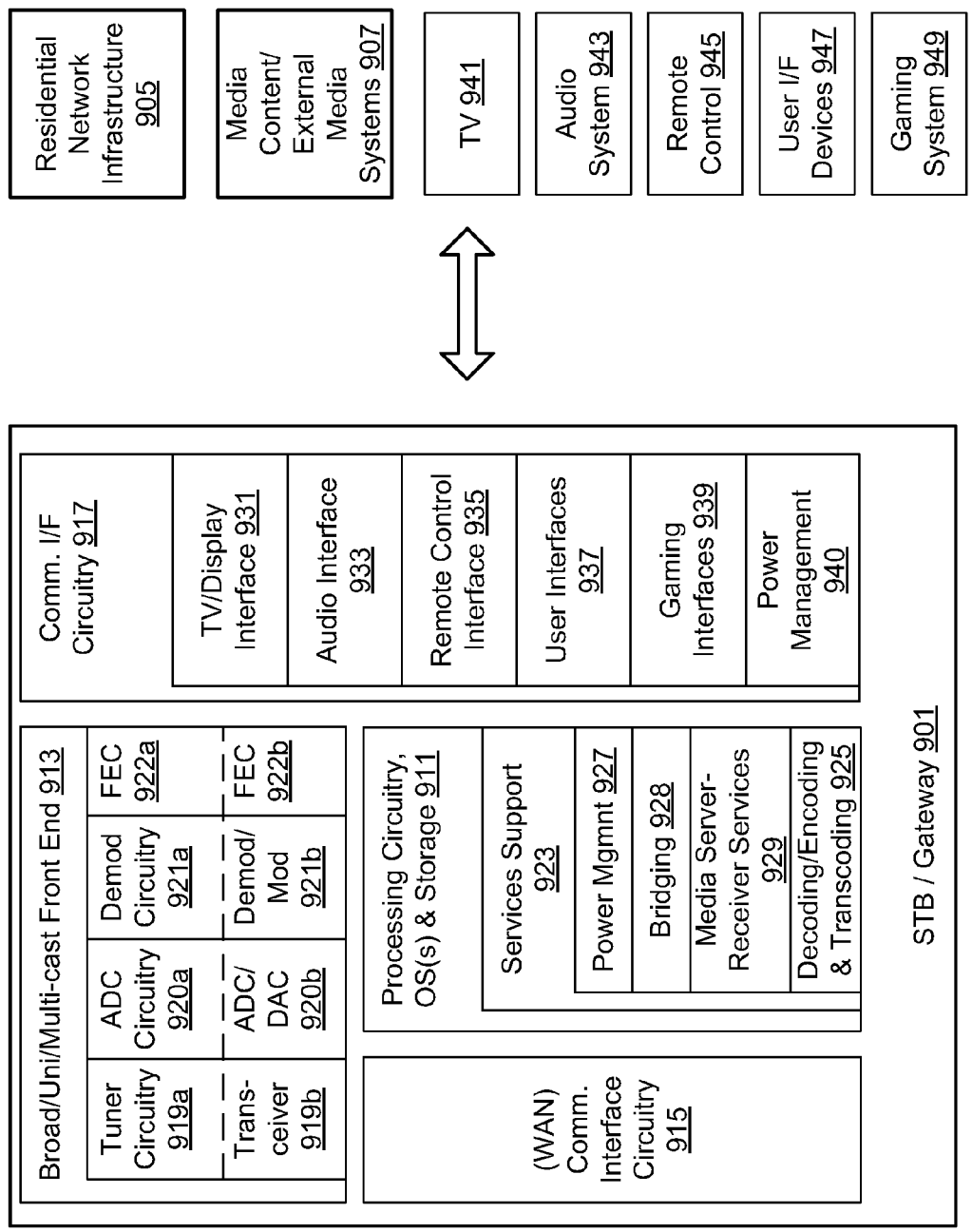
FIG. 9 is a schematic block diagram of a set top box (STB)/gateway (GW) in accordance with an embodiment of the present disclosure.

FIG. 9 is a schematic block diagram of a set top box (STB)/gateway (GW) 901 in accordance with an embodiment of the present disclosure. The STB/gateway 901 provides a number of functions, including conversion of signals from external sources into content that can be consumed by network devices. The STB/gateway 901 may further operate as a gateway that supports unidirectional or bidirectional communications and bridging between network devices.

The STB/gateway 901 of the illustrated embodiment interacts with a residential network infrastructure 905 and external media systems 907 via one or more wired and wireless networks/links. The wired and wireless networks/links may utilize one or more of various transmission media—such as coaxial cable, shielded twisted pair cable, fiber-optic cable, power line wires, and wireless media (radio frequencies, microwave, satellite, infrared, etc.)—and operate in accordance with a variety of communication and networking protocols (TCP/IP, UPnP, IPv6, etc.). In addition, the wired and wireless networks/links may comprise a multi-hop network utilizing a spanning tree protocol, direct wireless connections, peer-to-peer links, etc.

The external media systems 907 may comprise, for example, one or more of cable, satellite and/or terrestrial televisions systems. Various headend equipment and services can be utilized by these systems, such as a cable headend that receives television signals for further processing and distribution, and may offer various other services such as internet connectivity and VoIP services.

The STB/gateway 901 of the illustrated embodiment includes a broadcast/unicast/multicast front end 913 that operates to receive uncompressed or compressed digital video, digital audio and other data signals, from either the external media systems 907 or residential network infrastructure 905, for further processing and distribution. The front end 913 comprises tuner circuitry 919*a* operable to isolate particular channels. Signals from the tuner circuitry 919*a* are then provided to analog-to-digital (ADC) circuitry 920*a* and demodulation circuitry 921*a* for conversion into binary format/stream. Once in binary format, forward error correction (FEC) circuitry 922*a* checks the integrity of the received binary stream. Audio, video, and data extracted from the binary stream may then be decoded (e.g., by decoding 925) into formats suitable for consumption by downstream devices. It is noted that demodulation circuitry 921*a* may support one or more modulation techniques, such as Quadrature Phase Shift Keying (QPSK), Quadrature Amplitude Modulation (QAM), Coded Orthogonal Frequency-Division Multiplexing (COFDM), etc.

The front end 913 may be integrated into one or more semiconductor devices that may further support, for example, interactive digital television, networked DVR functionality, IP video over DOCSIS applications, and 3D graphics support. In addition, multiple tuner circuitry 919*a* (including in-band and out of band tuners), ADC circuitry 920*a* and demodulation circuitry 921*a* may be provided for different modulation schemes and television standards (such as PAL, NTSC, ATSC, SECAM, DVB-C, DVB-T(2), DVB-H, ISDB, T-DMB, Open Cable).

In one alternative embodiment of the disclosure, functionality of the STB/gateway 901 is performed by a smartphone or mobile computing device. In this embodiment, the "front end" 913 comprises one or more wireless interfaces (including PHY and baseband functions), such as a cellular (3G, 4G, IMT-Advanced, etc.) or wide area network (HetNet, Wi-Fi, WiMax, etc.) interface. The interface may support one or more modulation and multiplexing techniques, such as OFDM, OFDMA, SC-FDMA, QPSK, QAM, 64QAM, CSMA, MIMO, etc. In the illustrated embodiment, the wireless interface comprises a transceiver 919*b*, analog-to digital (ADC) and digital-to-analog (DAC) circuitry 920*b*, demodulation and modulation circuitry 921*b* and FEC (such as turbo codes or LDPC codes) circuitry 922*b*. Encoding, decoding and transcoding 925 functions may be provided by processing circuitry and storage 911.

The STB/gateway 901 also includes (wide area network) interface circuitry 915 for communicating with residential network infrastructure 905 and/or external media system 907. Through the communication interface circuitry 915, the STB/ gateway 901 may communicate directly with upstream resources, or offer (bidirectional) bridged communications between such resources and devices (e.g., devices 941-949) coupled to the STB/gateway 901.

In the embodiment of FIG. 9, STB/gateway 901 interacts with a variety of devices 941-949 via communication interface circuitry 917. For example, a television or display interface module 931 communicates with a (digital) television 941 or other media display device to relay television programming and enable available interactive media services. In certain embodiments, the television or display interface module 931 might include a remote user interface (RUI) server. Similarly, an audio interface 933 provides audio programming or audio library access to an audio system 943.

The communication interface circuitry 917 further comprises a remote control interface 935 for receiving control signals from a remote control 945. In addition to traditional remote control operations, the remote control 945 may further offer voice and/or gesture control signals that are relayed or mapped to relevant consumer devices. User interfaces 937 are also provided for communications with one or more user interface devices 947. Gaming interfaces 939 function to provide interactive communications with a gaming system 949. Such communications may involve, for example, online, multiplayer gaming between members of a social network and/or external players in a gaming platform. Power management interface 940 functionality is provided to enable power saving operations between devices 941-949.

The STB/gateway 901 of the illustrated embodiment includes processing circuitry, operating system(s) and storage 911 (components of which may be comprised of hardware, software, or combinations thereof), services support 923, and decoding/encoding/transcoding functionality 925 to support network interactions such as those described above. Services support 923 in this embodiment includes various functions such as power management 927, bridging 928, and media server-receiver services 929. Other traditional features of a STB/gateway may also be included. For example, the processing circuitry 911 may include a system-on-a-chip or like device(s) that provide a core processor, audio/video decoder, media processor/DSP, graphics core, encryption/ decryption core, adaptive transcoding, etc.

Figure 10:
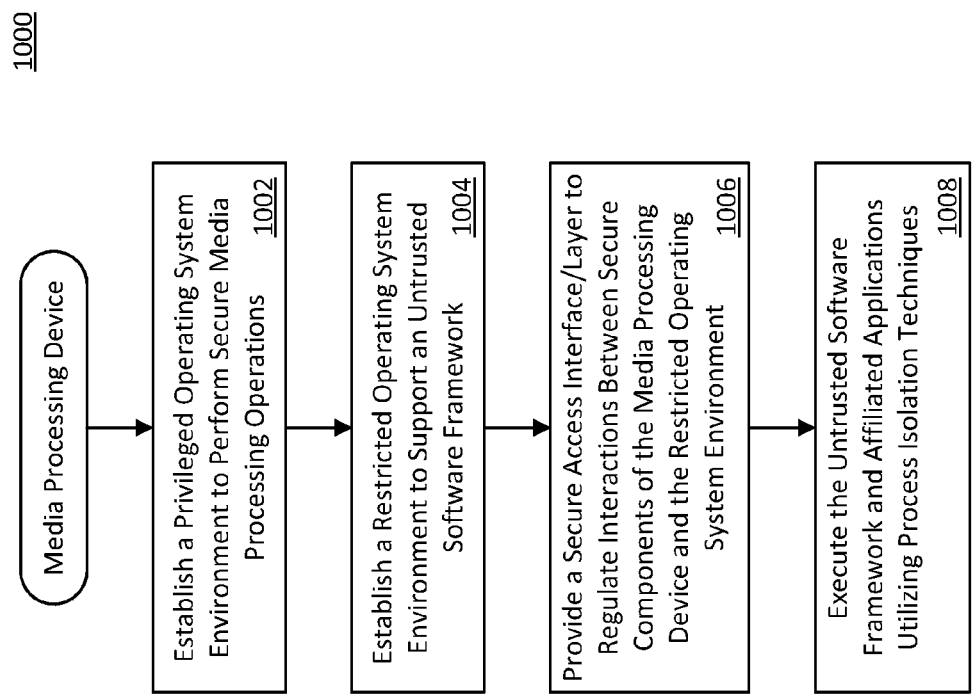
FIG. 10 is a logic diagram of a method for supporting interaction between a privileged operating system environment and software applications in accordance with an embodiment of the present disclosure.

FIG. 10 is a logic diagram of a method 1000 for supporting interaction between a privileged operating system environment or kernel (such as that used in a certified media processing device or set top box) and an untrusted software framework in a media processing device in accordance with an embodiment of the present disclosure. In step 1002 of the illustrated embodiment, a privileged operating system environment is established to perform secure media processing operations. Such operations might be controlled, for example, by a trusted set top box application. Next, in step 1004 (or in conjunction with step 1002), a restricted operating system environment is established to support the untrusted software framework. A secure access interface or layer such as those described above is provided in step 1006 to regulate interactions between secure components of the media processing device and the restricted operating system environment. In the illustrated ordering of steps, which may be performed in alternate sequences, execution of the untrusted software framework and affiliated software applications is performed in step 1008 utilizing one or more process isolation techniques.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A media processing device having software and hardware resources for performing media delivery operations, comprising:
   processing circuitry;
   a secure operating system environment, the secure operating system environment executed by the processing circuitry;
   a software framework, the software framework providing application programming interface functionality to support compatible applications; and
   a secure access interface configured to regulate communications between the secure operating system environment and the software framework, and to provide restricted access to at least a portion of the software and hardware resources for performing media delivery operations, the secure access interface comprising:
   a secure access server incorporated in the secure operating system environment, the secure access server configured to provide access to the secure operating system environment; and
   a plurality of secure access clients configured to interface with the secure access server, each secure access client having respective access rights to the secure operating system environment via the secure access server, first access rights providing full access to the secure operating system environment for a first application and second access rights providing limited access, relative to the first access rights, to the secure operating system environment for a second application.

2. The media processing device of claim 1, the secure access interface configured to utilize process isolation for applications executed via the software framework.

3. The media processing device of claim 1, the secure access interface performing at least one operation selected from the group consisting of: handle validation, heap pointer validation, non-pointer parameter validation, heap isolation, or resource release relating to unused resources.

4. The media processing device of claim 1, the secure access server executed as a secure kernel module, and at least one of the plurality of secure access clients incorporated in the software framework.

5. The media processing device of claim 4, wherein communications between the secure access server and the at least one of the plurality of secure access clients occur, at least in part, through inter-process communication calls.

6. The media processing device of claim 1, wherein the secure operating system environment comprises a Linux-based operating system kernel.

7. The media processing device of claim 1, wherein the software framework comprises at least one version of an Android framework.

8. The media processing device of claim 1 configured as a set top box device, the media processing device further comprising a set top box application executed by the processing circuitry in the secure operating system environment for performing media delivery operations, wherein communications between the set top box application and software framework occur, at least in part, via the secure access interface.

9. The media processing device of claim 8, the secure operating system environment comprising a privileged operating system environment to perform secure media processing operations, the secure operating system environment further configured to establish a restricted operating system environment,
   the set top box application executed in the privileged operating system environment and the software framework executed in the restricted operating system environment.

10. The media processing device of claim 1, further comprising:
    a software framework aggregator to support a plurality of additional software frameworks, the secure access interface further configured to regulate communications between the secure operating system environment and the software framework aggregator.

11. A method used in a media delivery device having a secure operating system kernel environment including a secure access server configured to provide access to services provided by the secure operating system kernel environment, and an untrusted software framework providing application programming interface functionality, comprising:
    establishing a privileged operating system environment to perform secure media processing operations supported by the secure operating system kernel environment;
    establishing a restricted operating system environment to support the untrusted software framework, the restricted operating system environment utilizing process isolation and including
    at least one of a plurality of secure access clients configured to interface with the secure access server, each of the plurality of secure access clients having respective access rights to the secure operating system kernel environment via the secure access server, first access rights providing access to the secure operating system kernel environment for a first application and second access rights providing limited access, relative to the first access rights, to the secure operating system kernel environment for a second application; and
    executing at least a portion of the untrusted software framework in the restricted operating system environment in accordance with the second access rights.

12. The method of claim 11, wherein the secure operating system kernel environment includes a symmetric multiprocessing Linux-based operating system kernel.

13. The method of claim 12, wherein the untrusted software framework comprises at least one version of an Android framework.

14. The method of claim 11,
    providing the secure access server and the plurality of secure access clients operating in combination to regulate interactions between the privileged operating system environment and components of the untrusted software framework.

15. The method of claim 11, the media delivery device further having a set top box application, the secure media processing operations performed in the privileged operating system environment by the set top box application in accordance with the first access rights.

16. The method of claim 11, the media delivery device having a first processing unit and a second processing unit, wherein the privileged operating system environment is executed on the first processing unit and the restricted operating system environment is executed on the second processing unit.

17. A media processing device comprising:
    processing circuitry;
    a software framework to support software applications; and an operating system executed by the processing circuitry in a secure operating system environment, the operating system configured to establish:

a privileged operating system environment to perform trusted media processing operations;

at least one restricted operating system environment that utilizes process isolation, the software framework executed in the at least one restricted operating system environment; and a secure access interface configured to regulate interaction between the secure operating system environment, the privileged operating system environment and the software framework, the secure access interface comprising:

a secure access server executed in the secure operating system environment;

a first secure access client configured to interface with the secure access server, the secure access server configured to provide access to the secure operating system environment by the first secure access client in accordance with first access rights applicable to the trusted media processing operations; and a second secure access client configured to interface with the secure access server, the secure access server configured to provide access to the secure operating system environment by the second secure access client in accordance with second access rights applicable to the software framework.

18. The media processing device of claim 17, further comprising:

a set top box application for performing the trusted media processing operations.

19. The media processing device of claim 18, the software framework and the set top box application implemented in accordance with at least one version of an Android framework.

20. The media processing device of claim 18, wherein the second access rights are limited as compared to the first access rights.

* * * * *